UNITED STATES PATENT OFFICE.

ARTHUR EICHENGRÜN, OF DUSSELDORF, GERMANY, ASSIGNOR TO FARBENFABRIKEN VORM. FRIEDR. BAYER & CO., OF ELBERFELD, GERMANY, A CORPORATION OF GERMANY.

COMPOSITION FOR GENERATING FORMALDEHYDE.

No. 885,233.      Specification of Letters Patent.      Patented April 21, 1908.

Application filed October 15, 1907. Serial No. 397,515.

*To all whom it may concern:*

Be it known that I, ARTHUR EICHENGRÜN, doctor of philosophy, chemist, citizen of the German Empire, residing at Dusseldorf, Germany, have invented new and useful Improvements in Composition for Generating Formaldehyde, of which the following is a specification.

My invention relates to new preparations generating gaseous formaldehyde by treating them with water. The new preparations are mixtures containing salts of certain peracids and polymeric formaldehyde, e. g. para-formaldehyde, trioxymethylene.

The present application relates to the same subject matter of invention as that for which I have already filed application Serial No. 319,963 June 2nd 1906.

The salts are mixed preferably with para-formaldehyde, and subsequently water is added to the mixture. The mixtures of the salts with the polymeric formaldehyde may be pressed into pastils or larger pieces, and in this form are ready to use.

The reaction which takes place on addition of water results very probably in the depolymerization of para-formaldehyde, and the consequent generation of formaldehyde at such a rise of temperature that the added water is converted into steam and oxygen is liberated from the permanganic acid salts. This reaction is probably caused by the catalytic action of para-formaldehyde on the permanganic acid salts, decomposing the same with the formation of alkali hydroxid, and the latter depolymerizing para-formaldehyde.

The reaction can be assisted by the addition of fixed alkaline compounds, such as sodium carbonate, calcium carbonate, sodium hydroxid, or the like. For carrying out this manner of proceeding, e. g. equal parts of sodium hydroxid, potassium permanganate and para-formaldehyde are mixed, and to the resulting mixture double the quantity of water is added. A lively evolution of gas takes place, and streams of formaldehyde and steam are given off which can be made use of for disinfecting closed rooms. The quantity of water used can be increased. Other salts of the above-mentioned permanganic acid react in an analogous manner, for example 2 parts of sodium hydroxid, 1 part of potassium permanganate, 1 part of permanganate of barium, 2 parts of para-formaldehyde are mixed and to the resulting mixture double the quantity of water is added. A lively evolution of gas takes place and streams of formaldehyde and steam are given off, which can be made use of for disinfecting closed rooms. Instead of 1 part of sodium hydroxid in the above examples I can also employ 1 part of potassium hydroxid or $1\frac{1}{2}$ parts of sodium carbonate or $1\frac{1}{2}$ parts of potassium carbonate. Or a stream of formaldehyde gas, mixed with steam can also be generated if one part of paraform and one part of potassium permanganate are mixed, and to the resulting mixture double the quantity of water is added.

Having now described my invention and in what manner the same is to be performed, what I claim as new and desire to secure by Letters Patent, is:—

1. A composition of matter generating gaseous formaldehyde and water vapor when treated with water, and consisting of a mixture of polymeric formaldehyde with salts of permanganic acid, substantially as hereinbefore described.

2. A composition of matter generating gaseous formaldehyde and water vapor when treated with water, and consisting of a mixture of para-formaldehyde with salts of permanganic acid, substantially as hereinbefore described.

3. A composition of matter generating gaseous formaldehyde and water vapor when treated with water, and consisting of a mixture of para-formaldehyde with permanganate of potassium, substantially as hereinbefore described.

4. A composition of matter generating gaseous formaldehyde and water vapor when treated with water, and consisting of a mixture of polymeric formaldehyde with salts of permanganic acid and fixed alkaline compounds, substantially as hereinbefore described.

5. A composition of matter generating gaseous formaldehyde and water vapor when treated with water, and consisting of a mixture of para-formaldehyde with salts of permanganic acid and fixed alkaline compounds, substantially as hereinbefore described.

6. A composition of matter generating gaseous formaldehyde and water vapor when treated with water, and consisting of a mixture of para-formaldehyde with permanganate of potassium and fixed alkaline compounds, substantially as hereinbefore described.

In testimony whereof I have hereunto set my hand in the presence of two subscribing witnesses.

ARTHUR EICHENGRÜN. [L. S.]

Witnesses:
 WM. WASHINGTON BRUNSWICK,
 OTTO KÖNIG.